(12) United States Patent
Pickrell

(10) Patent No.: US 7,275,664 B2
(45) Date of Patent: Oct. 2, 2007

(54) SELF ALIGNING SELF ENGAGING HOPPER DRIVE

(75) Inventor: Jason T. Pickrell, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 570 days.

(21) Appl. No.: 10/958,796

(22) Filed: Oct. 5, 2004

(65) Prior Publication Data

US 2006/0071037 A1    Apr. 6, 2006

(51) Int. Cl.
*G01F 11/20* (2006.01)
(52) U.S. Cl. .............................. 222/413; 222/1; 222/63; 222/64; 222/129.1; 222/236; 222/410
(58) Field of Classification Search .................. 222/1, 222/412–413, 410, 236, 230–231, 185.1, 222/63, 181.1, 64, 129.1, 52, 129.2, 333, 222/129.3, 129.4
See application file for complete search history.

(56) References Cited

U.S. PATENT DOCUMENTS

| 4,611,921 A | * | 9/1986 | Patel ....................... 366/156.1 |
| 5,277,337 A | | 1/1994 | Ford et al. |
| 5,287,993 A | | 2/1994 | Ford et al. |
| 5,330,078 A | * | 7/1994 | Ficken et al. ............ 222/129.4 |
| 5,918,768 A | | 7/1999 | Ford |
| 5,927,553 A | | 7/1999 | Ford |

* cited by examiner

*Primary Examiner*—Frederick C. Nicolas
(74) *Attorney, Agent, or Firm*—Barnes & Thornburg LLP

(57) ABSTRACT

Disclosed is a self-aligning auger drive assembly. The assembly includes a hopper with an auger supported therein. A shaft is connected to and extends from the auger externally from the hopper. A coupling is associated with the shaft and is operatively associated with a biasing device which creates an engaging force to promote engagement of the coupling with a motor assembly driver. A portion of the coupling defines a recess which receives at least a portion of the driver as the driver is rotated.

23 Claims, 5 Drawing Sheets

SELF ALIGNING SELF ENGAGING HOPPER DRIVE

BACKGROUND AND SUMMARY

The present disclosure relates to an assembly for driving an auger that is mounted inside a hopper used with a beverage maker to produce beverages, such as beverages made by mixing powdered concentrate with water.

An auger rotates inside the hopper to controllably advance the powdered beverage product towards an outlet opening for dispensing into a mixing chamber where it is mixed with water to form a beverage. The auger is typically driven by an external motor assembly that communicates with a shaft axially connected to the auger that extends outside the hopper. The shaft must be aligned properly with the motor assembly in order for the motor assembly to engage to shaft and drive the auger. Hoppers are routinely removed from the beverage maker to refill powdered beverage making product, for maintenance, cleaning, and other purposes. Typically, this is done by non-technical operators, such as convenience mart clerks or fast food workers. Such operators may not properly replace the hopper after removal. Misalignment of the hopper may cause damage to the interface between the motor and hopper. It is desirable to have a fast, simple method to realign the shaft and motor assembly when the hopper is being replaced.

Briefly, in accordance with the foregoing, disclosed is a self-aligning auger drive assembly. The assembly includes an auger for use inside the hopper. The auger has a shaft extending from the auger externally of the hopper. A coupling is associated with the shaft, the coupling being adapted to mate with a driver of a beverage maker's motor drive assembly. A sensor may be included to only allow operation of the beverage maker when the hopper is in position and/or when product remains in the hopper. In use, the hopper is positioned so that the coupling contacts the driver or the hopper is sensed to be in position. If the driver fails to align with the coupling during initial positioning, the driver may be rotated until the driver and coupling do align. A compression spring along the shaft causes the coupling to extend outwardly to mate with the driver during this alignment rotation which prevents stress to the auger drive assembly components.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
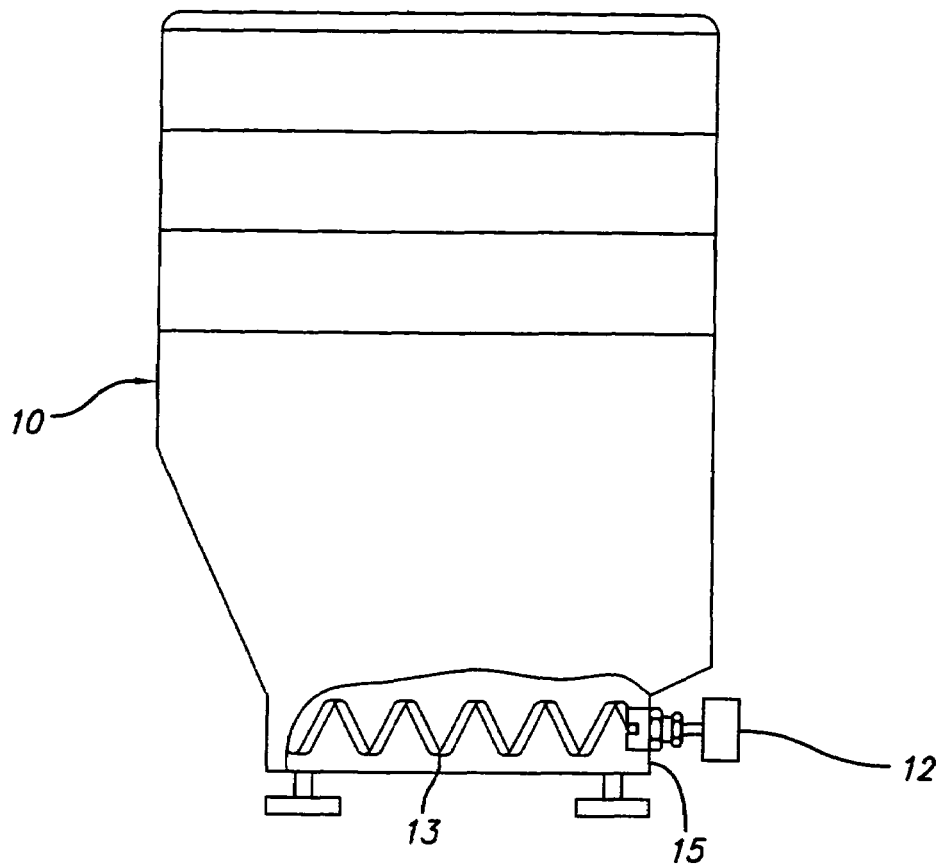
FIG. 1 is a partial fragmentary, side elevational view of one embodiment of a hopper with attached auger drive assembly.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

The present disclosure may be used in connection with a variety of beverage making machines. Terms including beverage, mixing, powder, drink and other related terms as may be used herein are intended to be broadly defined as including, but not limited to, the making of coffee, tea and any other beverages or food substances. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Figure 2:
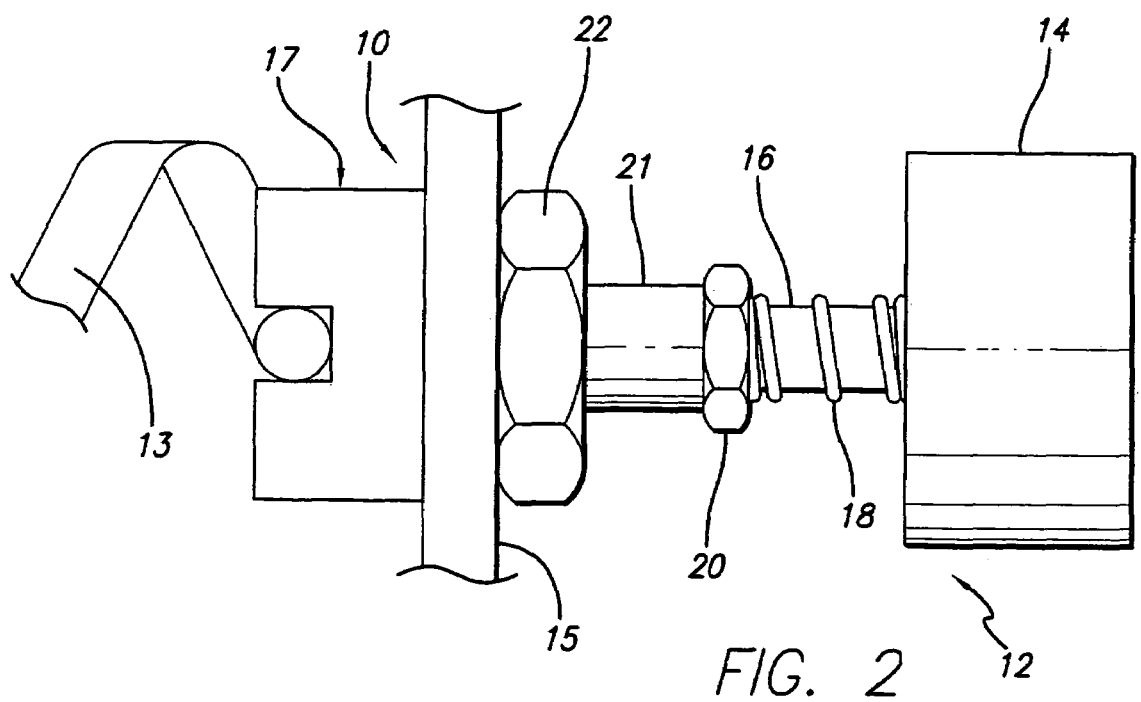
FIG. 2 is an enlarged side elevational view of an embodiment of an auger drive assembly.

With reference to the figures, FIG. 1 shows one embodiment of a hopper 10 of the present disclosure that includes an auger drive assembly 12 for driving an auger 13. As shown in FIG. 2, auger drive assembly 12 includes a coupling 14. Coupling 14 may be constructed from steel, aluminum, other metals, plastics or other suitable material. Coupling 14 is attached to a shaft 16 which is operatively connected to auger 13, such that when shaft 16 is rotated, auger 13 is cooperatively rotated. Coupling 14 has a limited travel toward and away from an adjacent hopper wall 15 along shaft 16, and is generally resiliently forced away from wall 15 by a biasing device such as a compression spring 18. Shaft 16 may include an attached or detachable end piece 19 (See FIGS. 7 and 9) that has a diameter that is greater than the shaft opening diameter of the coupling 14. Any suitable biasing device may be used including by way of example, but not limitation, an elastomeric material, belleville washer, or other suitable resilient structure. To provide sealing of hopper 10 and separation of coupling 14 from hopper 10, assembly 12 may also include a hex coupling 20, bushing 21, and aperture seal 22. Any suitable sealing structure that allows shaft to extend up to and through wall 15 without leaking or contaminating beverage product in hopper 10 may be used.

Also shown in FIG. 2 is a portion of the auger 13 coupled to an auger engaging structure 17. The auger engaging structure 17 is directly connected to the shaft which is connected to the coupling 14. Rotation of the coupling 14 as described in greater detail herein below results in rotation of the auger engaging structure 17. Further, attachment of the auger 13 to the auger engaging structure 17 results in rotation of the auger 13 in the bottom portion of the hopper 10.

Figure 3:
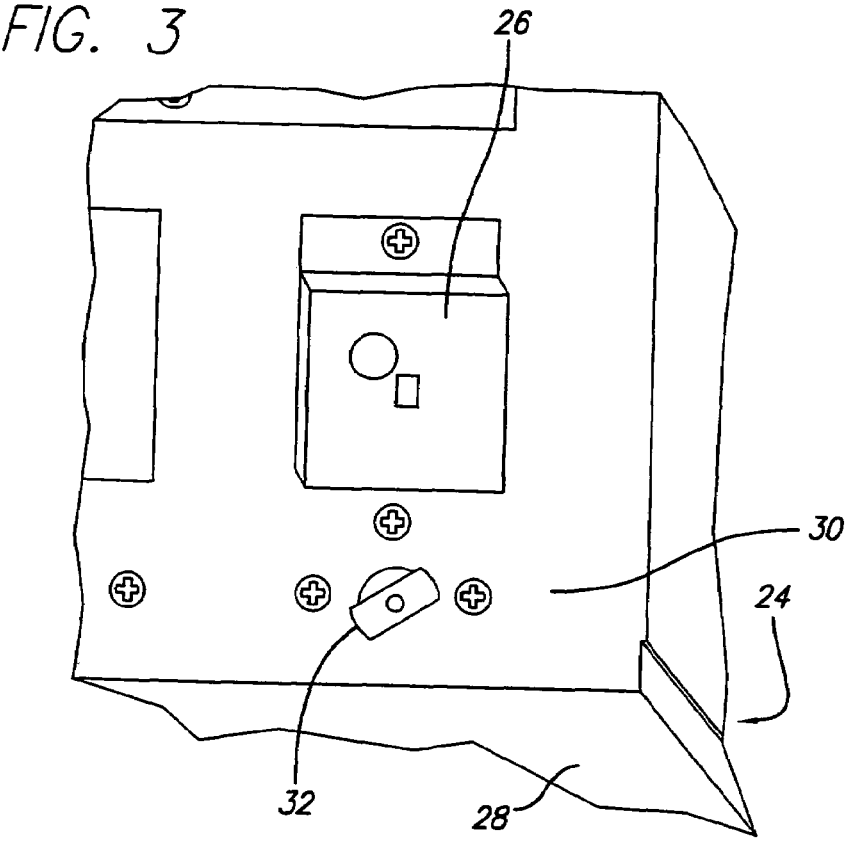
FIG. 3 is a perspective view of an interior of a powdered beverage maker, showing a view of the inside of a hopper cabinet showing a product sensor and auger driver.

FIG. 3 shows an interior of a beverage maker cabinet 24 onto which the hopper 10 is placed during operation. The term "cabinet" is meant to broadly cover any type of surface onto which hopper 10 may be placed. Cabinet 24 may have an open top or be covered, and may or may not have side walls. Cabinet 24 may include a sensor 26 positioned on vertical wall 30 which is used to sense a condition of hopper 10. An example of such a sensor is in U.S. Pat. No. 6,761,284 issued to the assignee of the present application and which is incorporated herein by reference in its entirety. Conditions may include whether hopper 10 is present, how close hopper 10 is to being in operating position, whether there is product inside hopper 10, and other conditions. Any suitable sensor 26 may be used, including by way of example, but not limitation, a light, contact, or conductance-based sensor. Sensor 26 may also be a level sensor which may be useful because different levels of product may require different types of auger operation, for example, increased auger rotation may be needed for large volumes of product and less auger operation may be needed for smaller volumes of product.

Hopper 10 is normally positioned inside the cabinet 24 by being placed onto horizontal floor 28 and pushed backed toward wall 30. Cabinet 24 has a motor assembly mounted thereon of which a driver 32 is visible in FIG. 3. Driver 32 is shown as an elongated protrusion having a rectangular shape, although other shapes including round, triangular, oblong, square, or irregular shapes may be used as well.

Figure 4:
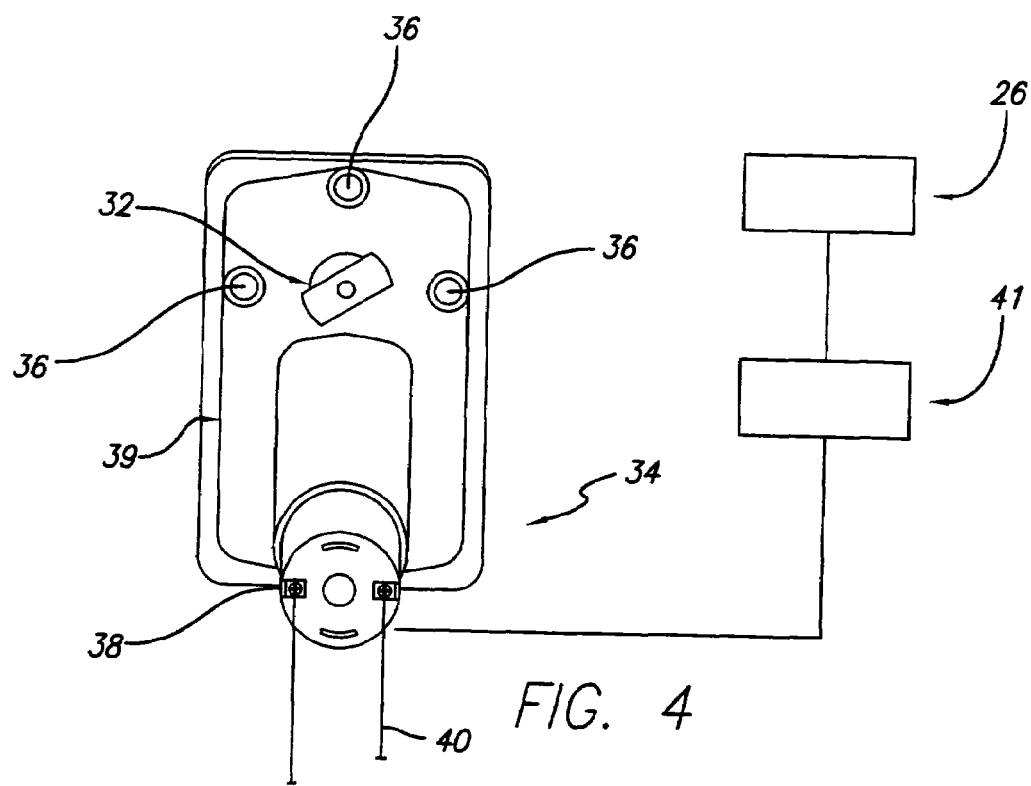
FIG. 4 is a perspective view of one embodiment of a driver module.

FIG. 4 is a perspective view of an auger motor assembly 34 detached from vertical wall 30. Auger motor assembly 34 may be integral with vertical wall 30 or be attached as a separate mounting structure as shown. Auger motor assembly 34 may include mounting holes 36 to allow mounting to vertical wall 30 using screws or other conventional fasteners. Auger motor assembly 34 includes a motor 38 which can be any type of suitable electric motor used in the art or any conventional auger motor and an associated gear assembly 39. The gear assembly 39 transfers the rotational force from the motor 38 to the driver 32. Electrical wires 40 are provided for connecting motor 38 to a beverage maker controller 41. The controller 41 may be coupled to the motor 38 and the sensor 26 for controlling various functions related to auger operation. For example, the controller 41 may be operative to permit operation of the motor only when hopper 10 is in position, only when sufficient product is sensed to be inside hopper 10, or only when another particular desire condition is achieved.

Figure 5:
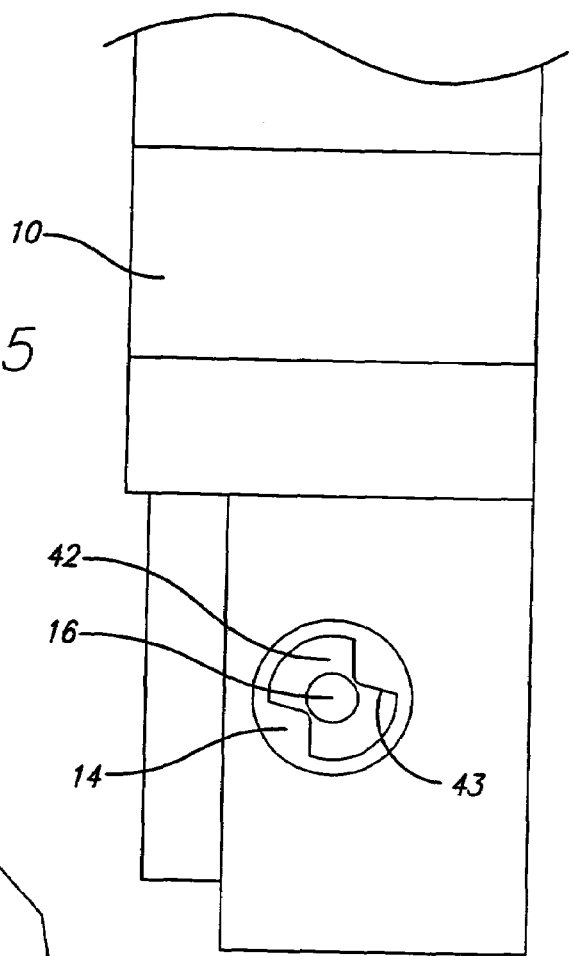
FIG. 5 is an enlarged, partial fragmentary view of one embodiment of a hopper, showing a coupling of the auger drive assembly.
Figure 6:
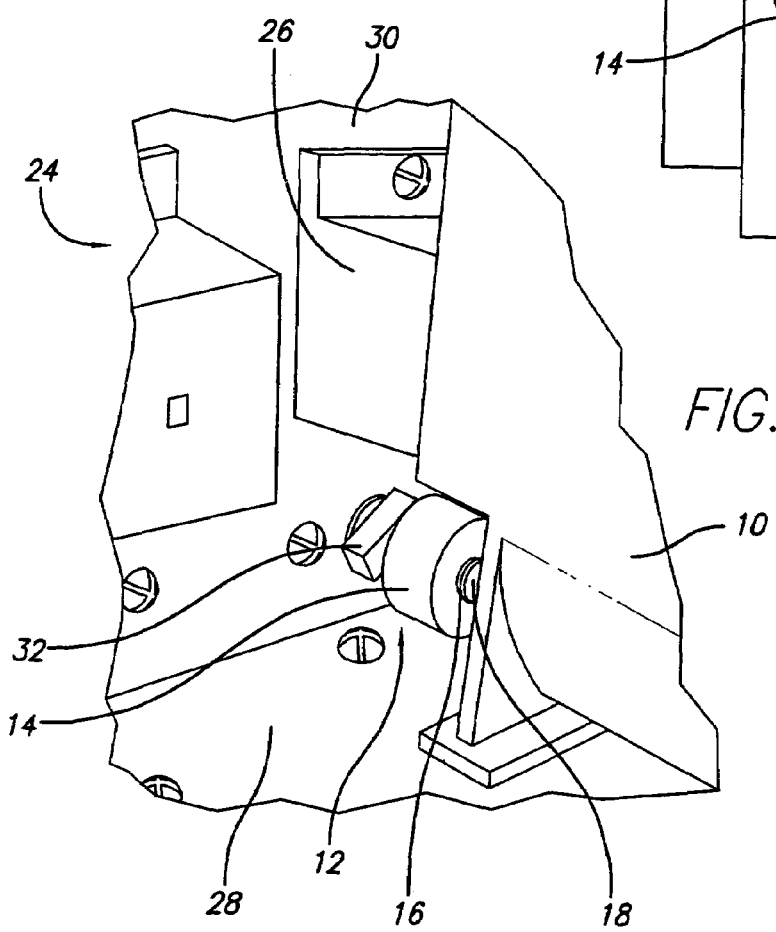
FIG. 6 is a perspective view of the hopper and the auger drive assembly of FIG. 5 inserted inside a cabinet for engagement with a driver.

FIG. 5 is a rear perspective view of hopper 10 that shows a cavity or a recess 42 defined by a wall 43 of the coupling 14 for receiving driver 32. Recess 42 generally has an inside dimension slightly larger than the outside dimension of driver 32, and may be tapered as shown to a bow-tie or hour-glass shape in order to more easily or cooperatively mate with driver 32. FIG. 6 shows hopper 10 positioned inside cabinet 24. Hopper 10 is positioned generally flush or in close proximity to sensor 26 and coupling 14 is in contact with driver 32. The beverage maker may also have two or more sets of motor and sensor assemblies for receiving two or more hoppers 10 which is desirable, for example, for multi-flavor beverage makers or high volume beverage makers where having two full hoppers of product is desirable.

Figure 7:
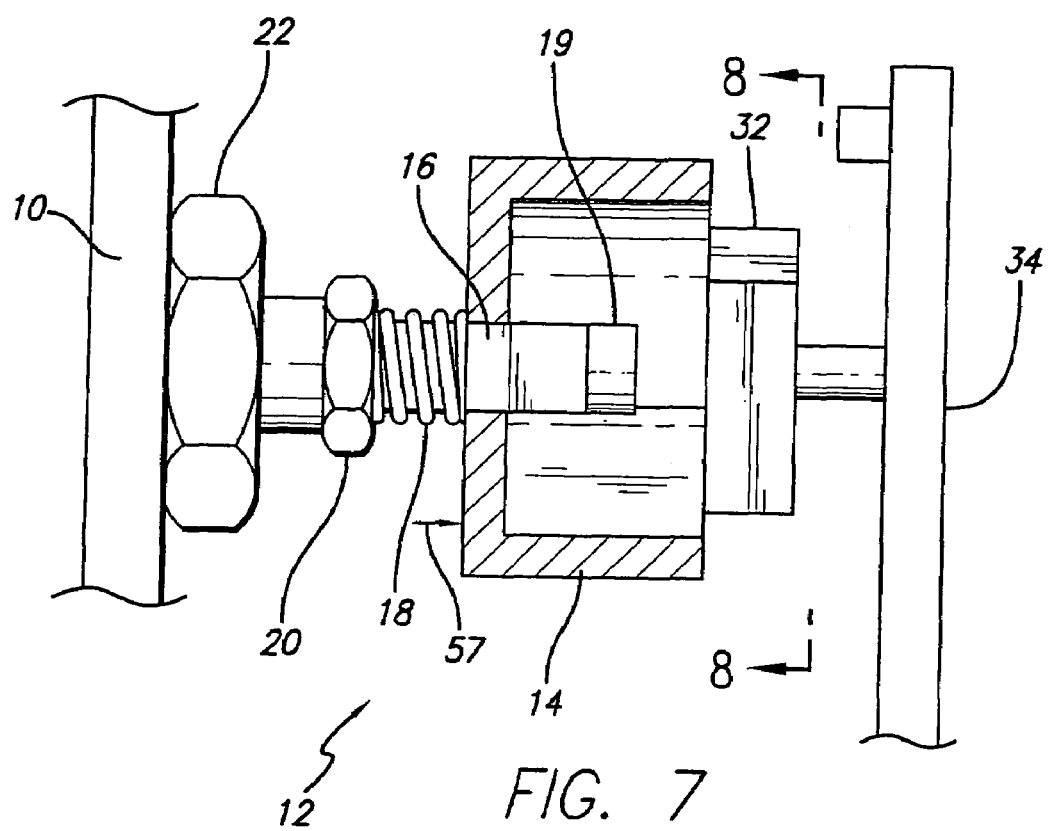
FIG. 7 is an enlarged side view of an auger drive assembly coupling engaging a driver in a non-aligned condition.

FIG. 7 is a perspective view of coupling 14 (shown in cross-section) when hopper 10 has been positioned against sensor 26, but the recess 42 is misaligned with driver 32. In this scenario, spring 18 compresses to allow coupling 14 to retract toward hopper 10. In this manner, hopper 10 is in position, but the misalignment does not cause any stress to the components of auger drive assembly 12. The spring-loaded action of coupling 14 allows coupling 14 to remain safely removed from driver 32.

In use, an operator will position hopper 10 in cabinet 24 and slide hopper 10 back toward wall 30. During this initial positioning, coupling 14 may align with driver 32. Sensor 26 may also sense a condition of hopper 10 to verify proper positioning or product content necessary before activating motor 38. In the event of an initial misalignment, once motor 38 is started, driver 32 will rotate and eventually align with recess 42 of coupling 14. When the driver 32 and coupling 14 align, compression spring 18 expands forcing coupling 14 away from hopper 10 toward wall 30 to engage the driver 32 in the recess 42. Motor 38 is then able to drive auger 13 by rotating driver 32 which rotates coupling 14 which rotates shaft 16 which is attached to auger 13. The auger drive assembly is thus self-aligning.

Figure 8:
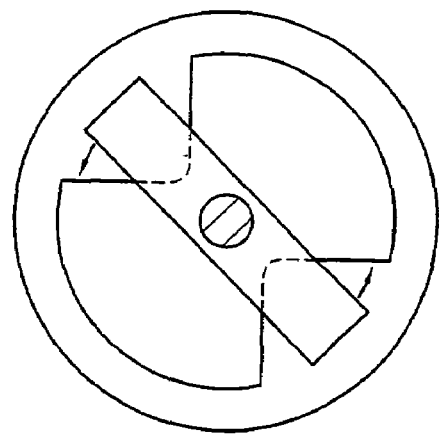
FIG. 8 is a cross-sectional view of the drive assembly taken along line 8-8 in FIG. 7 showing a non-aligned driver in relation to the corresponding coupling.
Figure 9:
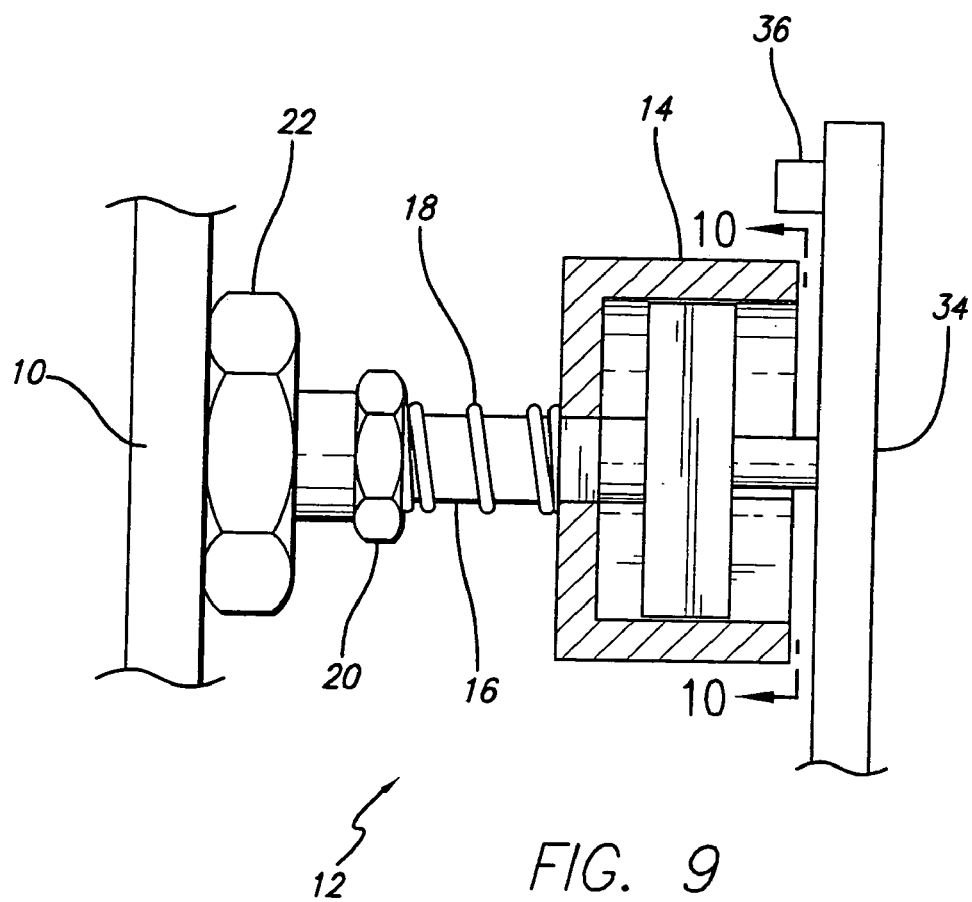
FIG. 9 is a perspective side view of an auger drive assembly engaging a driver in an aligned condition.
Figure 10:
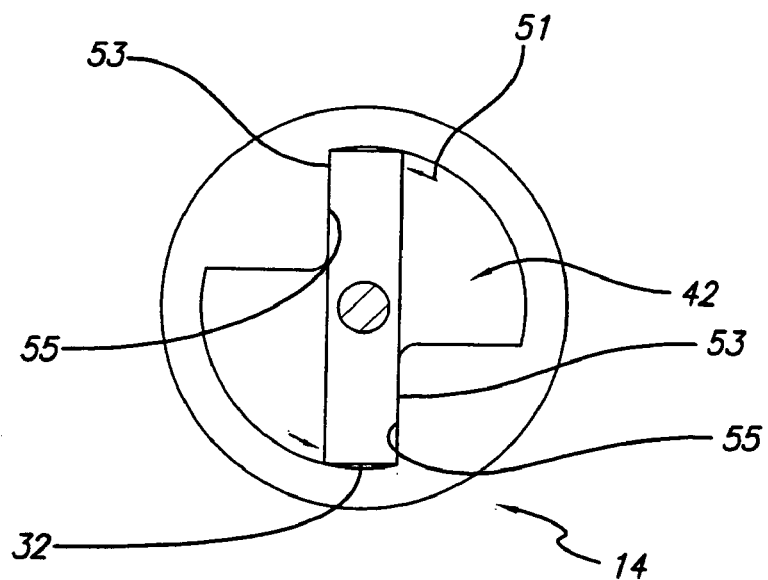
FIG. 10 is a cross-sectional side elevational view taken along line 10-10 in FIG. 9 showing a drive engaged in the recess of the corresponding coupling.

As shown in FIGS. 8 and 10, the end views show the misalignment (FIG. 8) of the driver 32 relative to the recess 42 of the coupling 14. Upon continued rotation of the driver 32 the driver 32 will engage a corresponding portion of the recess 42 of the coupling 14 (see FIG. 10). In this regard, the recess 42 can be provided to have a larger volume to accommodate the smaller volume driver 32. This facilitates quicker and easier engagement of the driver 32 in the recess 42. As shown in FIG. 10, once the driver 32 is engaged in the recess 42 continued rotation (51) results in engaging edges 53 of the driver 32 against corresponding surfaces 55 defined by the recess 42. As shown in FIG. 7, the spring 18 is compressed asserting a spring force 57 to engage the coupling 14 with the driver 32. As shown in FIG. 9, the spring 18 has been expanded upon engagement of the coupling 14 with the driver 32.

It should be noted that the coupling 14 for engagement with the driver 32 can be configured such that the components can be reversed. In this regard, the coupling 14 could be attached to the motor assembly for engagement with a corresponding driver 32 carried on the hopper 10. Similarly, the position of the spring-loaded component while shown positioned proximate to the coupling 14, could be configured such that it is positioned proximate to the cabinet 24. In this embodiment the driver 32 or coupling 14 extending from the cabinet 24 could be spring-loaded by means of the spring 18. With the foregoing in mind, many configurations of the coupling 14, driver 32 and spring 18 to provide an engaging force between the coupling 14 and driver 32 may be configured and still achieve the objective of the present disclosure.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation; that incorporate one or more of the features of the disclosure and fall within the spirit and scope of the present disclosure and the appended claims.

What is claimed is:

1. A hopper drive assembly for beverage makers, the hopper drive assembly comprising:
    a hopper;
    an auger mounted inside the hopper;
    a shaft connected to the auger, the shaft extending externally from the hopper;
    a coupling attached to the shaft;
    a driver releasably engaging the coupling;
    a motor assembly in communication with the driver, the motor assembly controllably driving the driver; and
    a biasing device operatively associated with at least one of the coupling and the driver providing an engaging force to promote engagement of the coupling with the driver.

2. The assembly of claim 1, further comprising a controller in communication with the motor assembly.

3. The assembly of claim 2, further comprising a sensor for sensing the condition of the hopper, the sensor being in communication with the controller.

4. The assembly of claim 3, further comprising the sensor being adapted to sense a presence of product in the hopper.

5. The assembly of claim 3, further comprising the sensor being adapted to sense a presence of the hopper.

6. The assembly of claim 1, the coupling further comprising a portion of the coupling defining a recess for receiving at least a portion of the driver.

7. The assembly of claim 6, the driver further comprising a generally elongated protrusion.

8. The assembly of claim 6, the recess further comprising a bow-tie shaped recess sized and dimensioned for cooperatively engaging the driver.

9. The assembly of claim 8 further comprising a beverage maker cabinet, the cabinet having a horizontal floor; and a wall extending generally vertically from a rear edge of the horizontal floor, the driver being positioned proximate the wall.

10. The assembly of claim 9, further comprising the shaft extending externally from the hopper at a height above the horizontal floor, and the driver being positioned relative to the vertical wall at a corresponding height for cooperative engagement with the coupling.

11. The assembly of claim 10, further comprising a controller in communication with the motor assembly and a sensor for sensing the condition of the hopper and in communication with the controller.

12. The assembly of claim 11, further comprising the sensor being mounted on the wall at a second height above the horizontal floor, the second height being greater than the height.

13. The assembly of claim 12, further comprising the sensor being positioned to sense a presence of product in the hopper, the controller controllably operating the motor assembly to permit a rotation of the driver in response to the sensor sensing the presence of product in the hopper.

14. The assembly of claim 12, further comprising the sensor being positioned to sense a presence of the hopper, the controller controllably operating the motor assembly to permit a rotation of the driver in response to the sensor sensing the presence of a hopper.

15. A method of driving an auger mounted inside of a hopper, the method comprising the steps of:
    providing an auger mounted inside the hopper; the auger having a shaft connected to the auger, the shaft extending externally from the hopper, a coupling attached to the shaft, and a biasing device operatively associated with at least one of the coupling and a driver;
    providing the driver, the driver releasably engaging the coupling, providing a motor assembly in communication with the driver, the motor assembly controllably driving the driver;
    positioning the hopper so that the coupling contacts the driver;
    having the biasing device provide an engaging force to promote engagement of the coupling with the driver;
    rotating the driver until the driver engages the coupling; and
    in response to the driver engaging with the coupling, rotating the shaft to drive the auger.

16. The method of claim 15, further comprising the steps of:
    providing a sensor, the sensor being positioned to sense the presence of the hopper in proximity to the driver;
    providing a controller in communication with the sensor;
    in response to the sensor sensing the presence of the hopper, operating the motor assembly to permit rotation of the driver.

17. The method of claim 16, further comprising controllably operating the motor assembly to rotate the driver to drive the auger.

18. The method of claim 15, the coupling further comprising a portion of the coupling defining a recess for receiving at least a portion of the driver, the method further comprising the step of, in response to the coupling not receiving the driver in the recess when the coupling contacts the driver, retracting the coupling.

19. The method of claim 18, further comprising rotating the driver until the driver engages with the coupling by being received in the recess.

20. A method of driving an auger mounted inside of a hopper, the method comprising the steps of:
    providing the auger, the auger being mounted inside the hopper, a shaft connected to the auger, the shaft extending externally from the hopper, a coupling attached to the shaft, a biasing device operatively associated with at least one of the coupling and a driver, the coupling further comprising a portion of the coupling defining a recess;
    providing a beverage making cabinet, the cabinet having a horizontal floor, and a wall, the wall extending vertically from a rear edge of the floor, a motor assembly attached to the wall, the driver releasably engaging the coupling, the driver being attached to and rotatably operated by the motor assembly;
    sliding the hopper along the floor toward the rear edge until the coupling contacts the driver;
    in response to the coupling not receiving the driver in the recess when the hopper is slid into position, retracting the coupling;
    rotating the driver until the driver is aligned with and received in the recess; and
    further rotating the driver to drive the auger.

21. The method of claim 20, further comprising:

providing a sensor along the wall, the sensor being positioned to sense a condition of the hopper; and rotating the driver in response to the sensor sensing a desired condition.

22. The method of claim 21, further comprising the desired condition being proper positioning of the hopper.

23. The method of claim 21, further comprising the desired condition being a presence of product in the hopper.

* * * * *